(12) United States Patent
Sanford

(10) Patent No.: US 12,398,721 B2
(45) Date of Patent: Aug. 26, 2025

(54) GAS OPERATED INFINITE STEP VALVE FOR A RECIPROCATING COMPRESSOR

(71) Applicant: SIEMENS ENERGY, INC., Orlando, FL (US)

(72) Inventor: Joel T. Sanford, Bath, NY (US)

(73) Assignee: Siemens Energy, Inc., Orlando, FL (US)

( * ) Notice: Subject to any disclaimer, the term of this patent is extended or adjusted under 35 U.S.C. 154(b) by 405 days.

(21) Appl. No.: 17/617,044

(22) PCT Filed: Jun. 10, 2019

(86) PCT No.: PCT/US2019/036319
§ 371 (c)(1),
(2) Date: Dec. 7, 2021

(87) PCT Pub. No.: WO2020/251530
PCT Pub. Date: Dec. 17, 2020

(65) Prior Publication Data
US 2022/0243722 A1    Aug. 4, 2022

(51) Int. Cl.
*F04B 49/24* (2006.01)
*F04B 39/10* (2006.01)
(Continued)

(52) U.S. Cl.
CPC .............. *F04B 49/24* (2013.01); *F04B 39/10* (2013.01); *F04B 49/03* (2013.01); *F16K 15/066* (2013.01)

(58) Field of Classification Search
CPC .......... F04B 49/24; F04B 39/10; F04B 49/03; F16K 15/066
See application file for complete search history.

(56) References Cited

U.S. PATENT DOCUMENTS 8,070,461 B2 * 12/2011 Sanford ................ F04B 39/08
                                                        417/306
8,308,455 B2 * 11/2012 Wallis .................... F04B 27/24
                                                        417/446
(Continued)

FOREIGN PATENT DOCUMENTS

FR       2131709 A5    11/1972
JP    2010144793 A      7/2010
(Continued)

OTHER PUBLICATIONS

PCT International Search Report and Written Opinion mailed Dec. 13, 2019 corresponding to PCT Application No. PCT/US2019/036319 filed Jun. 10, 2019.

*Primary Examiner* — Nathan C Zollinger

(57) ABSTRACT

An improved inlet valve system for a cylinder chamber of a reciprocating compressor and a method for utilizing a high pressure gas source to control an inlet valve system for a cylinder chamber of a reciprocating compressor is disclosed. The inlet valve system may include an unloader, a valve assembly including a cylindrical valve body circumferentially disposed about a central axis of the inlet valve system, and a control valve actuator including a control valve body. The valve assembly may include a plurality of inlet valve elements disposed respectively in valve element ports fluidly connected to a control valve passage. A high pressure gas source is utilized to hold open and close the inlet valve elements via the control valve passage in order to control the capacity of the reciprocating compressor.

18 Claims, 6 Drawing Sheets

(51) Int. Cl.
*F04B 49/03* (2006.01)
*F16K 15/06* (2006.01)

(56) References Cited

U.S. PATENT DOCUMENTS

| | | | |
|---|---|---|---|
| 10,253,765 B2 | 4/2019 | Bagagli et al. | |
| 11,015,591 B2* | 5/2021 | Sanford | F04B 49/06 |
| 11,384,753 B1* | 7/2022 | Sanford | F04B 49/03 |
| 11,732,707 B2* | 8/2023 | Sanford | F04B 7/02 |
| | | | 417/437 |
| 11,781,664 B2* | 10/2023 | Shade | F04B 49/03 |
| | | | 137/473 |
| 2009/0238699 A1 | 9/2009 | Sanford | |
| 2013/0015385 A1 | 1/2013 | Marica | |
| 2014/0294619 A1* | 10/2014 | Mangiagli | F04B 49/243 |
| | | | 251/129.01 |
| 2016/0305414 A1 | 10/2016 | Mitsch | |
| 2019/0293064 A1* | 9/2019 | Sanford | F04B 49/06 |
| 2022/0186720 A1* | 6/2022 | Sanford | F04B 39/14 |

FOREIGN PATENT DOCUMENTS

| | | | |
|---|---|---|---|
| RU | 2613149 C2 | 3/2017 | |
| RU | 2658177 C2 | 6/2018 | |
| UA | 83830 C2 | 8/2008 | |
| WO | WO-2018009402 A1 * | 1/2018 | F04B 49/02 |

* cited by examiner

GAS OPERATED INFINITE STEP VALVE FOR A RECIPROCATING COMPRESSOR

BACKGROUND

1. Field

The present disclosure relates generally to compressors and, more particularly, to an inlet valve system for a cylinder chamber of a reciprocating compressor.

2. Description of the Related Art

Reciprocating compressors are a type of compressor used for pressurizing and/or compressing process gases or fluids. The typical reciprocating compressor includes a cylinder or other body defining a cylinder or compression chamber and a piston movably disposed therein. The structure of the reciprocating compressor provides linear reciprocating displacement of the piston within the cylinder chamber to compress the process fluid located within the cylinder chamber, which is subsequently discharged at the increased pressure.

To better control the maximum pressure in the compressor and/or the output rate of the compressed process fluid, reciprocating compressors may include an unloader that provides a fixed volume chamber removably connectable with the cylinder chamber. In general, a valve assembly controls the flow between the cylinder chamber and the unloader chamber and determines when the process fluid is able to move between the two chambers and alternatively when the chambers are sealed or isolated from each other. For example, an infinite step control (ISC) valve system may be used to unload an inlet valve on the reciprocating compressor by holding the inlet valve open longer than in a typical cycle for allowing process gas to re-enter the inlet passage on the unloader.

SUMMARY

Briefly described, aspects of the present disclosure relate to an inlet valve system for a cylinder chamber of a reciprocating compressor and a method to utilize a high pressure gas source to control the inlet valve system.

A first aspect provides an inlet valve system for a cylinder chamber of a reciprocating compressor. The inlet valve system includes an unloader including a cylindrical unloader body circumferentially disposed about a central axis of the inlet valve system and having an enclosed end opposite an open end, a central bore extending between the enclosed end and the open end within the cylindrical unloader body and defining an unloader chamber, and an inlet passage defined by the cylindrical unloader body and configured to provide fluid communication between the central bore and a location external of the cylindrical unloader body. The inlet valve system also includes a valve assembly including a cylindrical valve body circumferentially disposed about the central axis of the inlet valve system. The valve assembly includes first end opposite a second end, a plurality of first valve passages, a plurality of second valve passages, a first connective passage, a second connective passage, a plurality of inlet valve elements disposed in a plurality of valve element ports, and a central bore ending between the first end and the second end of the cylindrical valve body and along the central axis of the inlet valve system. The valve assembly may be disposed at the open end of the cylindrical unloader body. The plurality of first valve passages may extend between the first end of the cylindrical valve body and the first connective passage, and each of the first valve passages has a valve seating surface adjacent the first connective passage. The plurality of second valve passages may extend between the second end of the cylindrical valve body and the first connective passage. The second connective passage may extend between the plurality of valve element ports and the central bore of the cylindrical valve body. Each valve element port at least partially contains a respective inlet valve element of the plurality of inlet valve elements. Each inlet valve element may be configured to move between a closed position to an opened position by applying differential gas pressures to a front element surface of a front element portion of the inlet valve element and to a rear element surface of a rear element portion of the inlet valve element. The inlet valve element may be configured to disengage the valve seating surface of the first valve passage adjacent the first connective passage in the opened position when applying a higher second pressure to the rear element surface than a first pressure at the front element surface. The inlet valve element may be configured to engage the valve seating surface of the first valve passage adjacent the first connective passage in the closed position by discontinuing the application of the higher pressure to the rear element surface so that the second pressure is the same as the first pressure. The inlet valve system also includes a control valve actuator including a control valve body circumferentially disposed about the central axis of the inlet valve system. The control valve actuator includes a first end opposite a second end, a control valve passage of the control valve body extending along the central axis of the inlet valve system, a control element disposed in the control valve passage, and a control pressure source fluidly coupled to the control valve passage.

A second aspect provides an compressor having multiple stages of compression. The compressor includes a plurality of reciprocating compressors, each compressor corresponding to a compression stage of the compressor. The plurality of reciprocating compressors include at least one high pressure inlet valve system as described above disposed in a cylinder chamber of a first reciprocating compressor corresponding to a first stage of the compressor. The plurality of reciprocating compressors also includes at least one low pressure inlet valve system disposed in a reciprocating compressor corresponding to a higher stage of the compressor, such as the second stage or higher. The low pressure inlet valve system operating such that when applying a control gas having a lower pressure to a rear element surface than a pressure at a front element surface of an inlet valve element of the low pressure inlet valve system, the inlet valve element is disengaged from a valve seating surface. The control gas may be vented to an inlet of the first reciprocating compressor.

A third aspect provides a method for utilizing a high pressure gas source to control an inlet valve system of a reciprocating compressor. The method includes flowing a process fluid from an unloader, through a valve assembly, and into the cylinder chamber. The valve assembly may include a plurality of inlet valve elements, where each inlet valve element is disengaged with a valve seating surface in an opened position for providing the process fluid to flow through the valve assembly. Each inlet valve element is disengaged with a valve seating surface in an opened position, where each inlet valve element has a front element surface and a rear element surface, and where the process fluid applies a first pressure to each of the front element surfaces. The method also includes flowing a control gas from the high pressure gas source to the rear element surfaces by adjusting the control valve actuator to an open position, where the control gas applies a second pressure to each of the rear element surfaces to maintain each of the inlet valve elements disengaged with the valve seating surface in the opened position, wherein the second pressure is higher than the first pressure, and adjusting the control valve actuator 300 to a closed position to cease the control gas flowing to the rear element surfaces 265, wherein an equalized pressure exists at each of the rear element surfaces 265 as that at the front element surfaces 262 and moves each of the inlet valve elements 260 to engage the valve seating surfaces 224 in a closed position.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

An infinite step valve system as presented in the patent application U.S. Ser. No. 16/301,197, incorporated herein by reference, utilizes gas pressure to open and close the inlet valve on a reciprocating compressor. The design of this infinite step valve system uses low pressure gas to control the opening and closing such that a pressure in the cylinder chamber is lower than the inlet pressure for a given stage of compression. Having the inlet pressure higher than that of the cylinder chamber causes gas to be vented on a first stage of a compressor. Venting gas on the first stage is undesirable because the gas would have to be sent to the atmosphere or to a recovery system where the gas would be unusable by the reciprocating compressor. An improved inlet valve system for infinite step control in which gas is not vented is thus desirable. In an embodiment, the inlet step valve system using low pressure to control the valve elements may be modified by permanently sealing the control valve actuator to exist in a closed state. The inlet valve elements may also be modified to seal within the valve element port when disengaged from the valve seating surface. These modifications work to not vent the low pressure gas. Another alternative, presented below, uses a high pressure gas to control the inlet valve system.

Broadly, this disclosure provides an inlet valve system for a cylinder chamber of a reciprocating compressor that utilizes higher pressure gas from the discharge side of a given stage of the compressor to hold open and close the inlet valve eliminating the need to vent gas.

Figure 1:
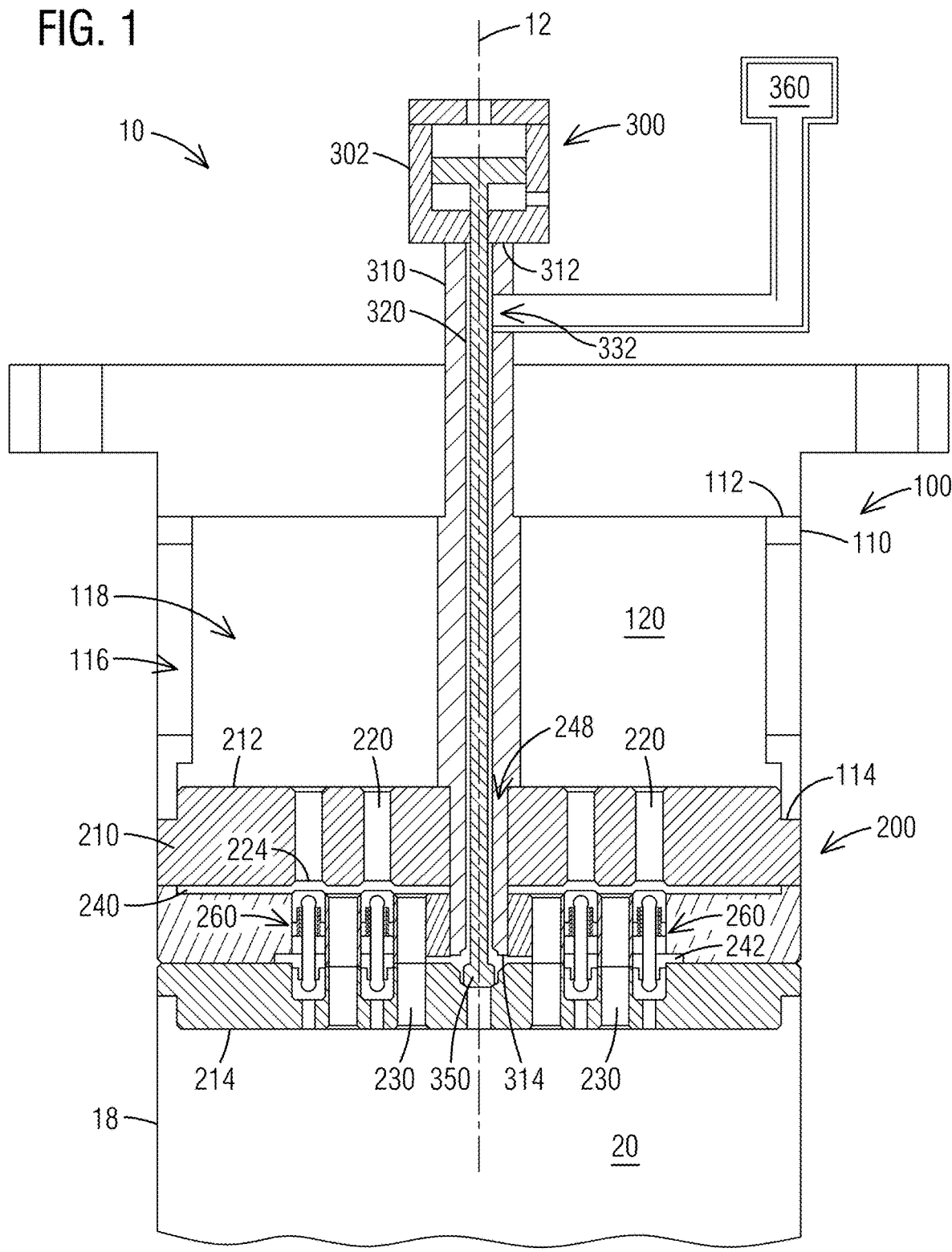
FIG. 1 depicts a cross sectional view of an exemplary inlet valve system containing an unloader, a valve assembly, and a control valve actuator and coupled to a cylinder chamber of a reciprocating compressor, according to one or more embodiments.

FIG. 1 depicts a cross-sectional view of an exemplary inlet valve system 10 that may be fluidly coupled to a compression or cylinder chamber 20 defined by a cylinder 18 of a reciprocating compressor (not shown), according to one or more embodiments. The inlet valve system 10 may be used for infinite step control and may include one or more unloaders 100, one or more valve assemblies 200, and one or more control valve actuators 300 (one each of the unloader 100, the valve assembly 200, and the control valve actuator 300 is shown in the Figures). The valve assembly 200 may be coupled to and in fluid communication with the unloader 100 and the control valve actuator 300, and the unloader 100 may be coupled to the control valve actuator 300, as will be discussed and described below.

The unloader 100 may include a cylindrical unloader body 110 circumferentially disposed about a central axis 12 of the inlet valve system 10. The cylindrical unloader body 110 may have an enclosed end 112 opposite an open end 114 and a central bore 118 extending between the enclosed end 112 and the open end 112 within the cylindrical unloader body 110 and defining an unloader chamber 120. The cylindrical unloader body 110 may have one or more inlet passages 116 defined by and passing therethrough the cylindrical unloader body 110. Each of the inlet passages 116 may be configured to provide fluid communication between the central bore 118 and a location external or outside of the cylindrical unloader body 110, as well as between the unloader chamber 120 and the location external or outside of the cylindrical unloader body 110. For example, one or more process fluids or gases may be transferred from the location external or outside of the cylindrical unloader body 110 via a conduit (not shown), through the inlet passage 116, and into the unloader chamber 120. The unloader chamber 120 may provide a fixed or constant volume for containing the process fluid prior to unloading or otherwise transferring to the cylinder chamber 20.

Figure 2:
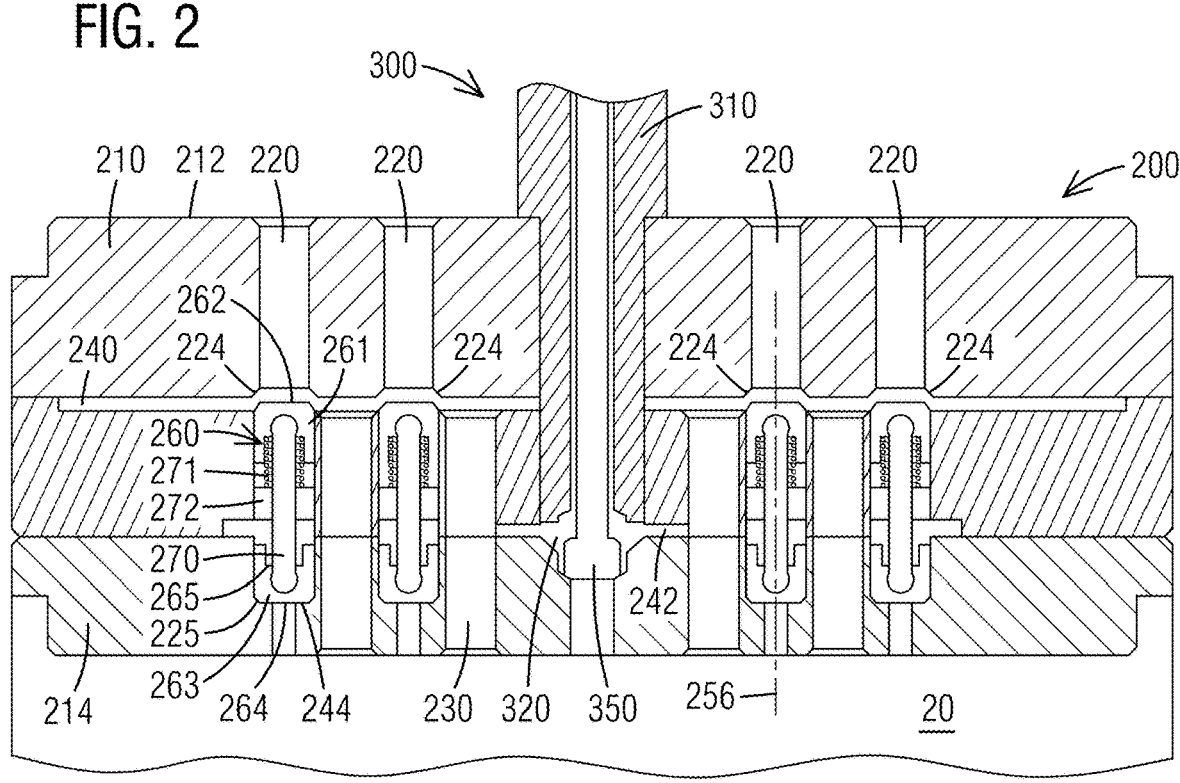
FIG. 2 depicts an enlarged view of the valve assembly and the control valve actuator in an opened state.
Figure 3:
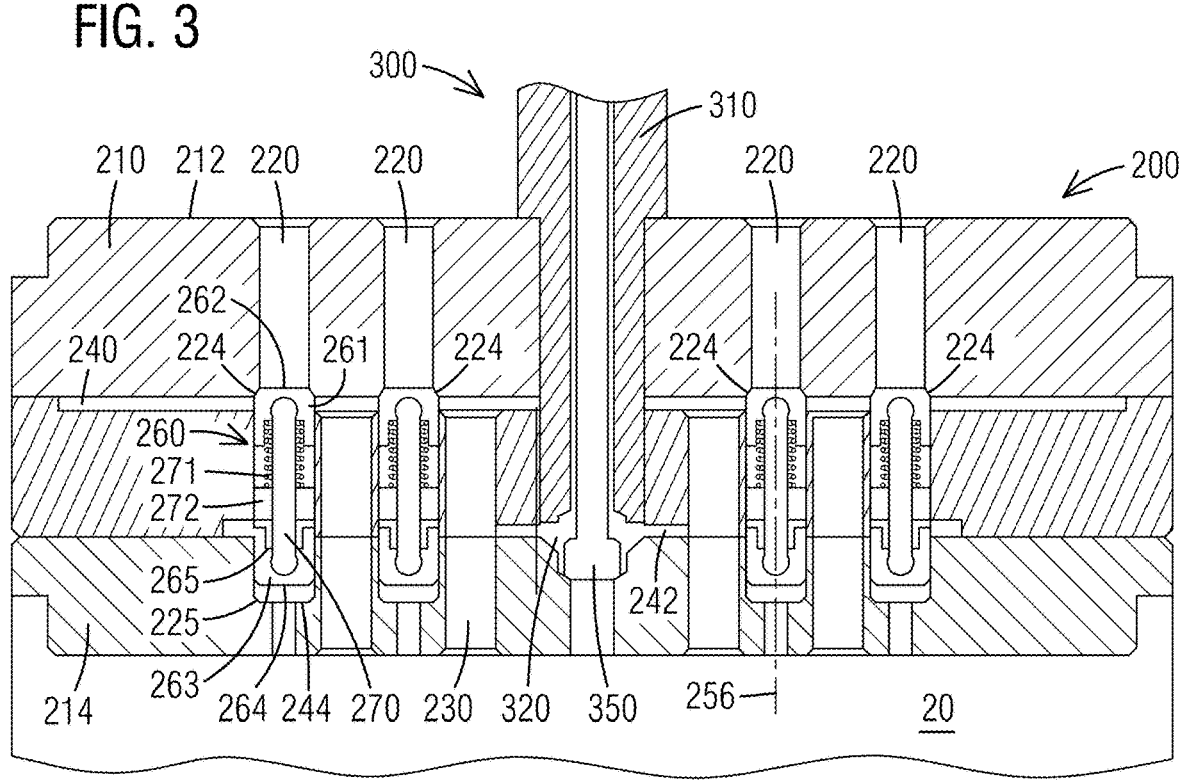
FIG. 3 depicts an enlarged view of the valve assembly and the control valve actuator in a closed state.

As further illustrated in FIG. 1, as well as in FIGS. 2-3, the valve assembly 200 may include a valve body, illustrated as a cylindrical valve body 210, circumferentially disposed about the central axis 12 of the inlet valve system 10. Although illustrated as cylindrical in FIGS. 1-3, the valve body may be non-cylindrical in one or more embodiments. The valve assembly 200 may be disposed at the open end 114 of the cylindrical unloader body 110. The cylindrical valve body 210 may have a first end 212 opposite a second end 214 and may be formed from or include a single unitary piece or two, three, or more pieces, such as metal containing plates.

In an embodiment, the cylindrical valve body 210 may be a single unitary piece. An advantage to utilizing a single unitary piece instead of multiple pieces may be that the pressure does not tend to separate the valve body 210 which may create gas leakage. In an embodiment, the single unitary piece may be manufactured by additive manufacturing.

The cylindrical valve body 210 may also include a plurality of first valve passages 220, a plurality of second valve passages 230, one or more first connective passages 240, one or more second connective passages 242, a plurality of inlet valve elements 260 disposed in a plurality of valve element ports 244, and a central bore 248. The plurality of first valve passages 220 may extend between the first end 212 of the cylindrical valve body 210 and the first connective passage 240. The plurality of first valve passages 220 may extend in a vertical direction parallel with the central axis 12 of the inlet valve system 10. The first connective passage 240 may extend between in a horizontal direction perpendicular to the central axis 12 of the inlet valve system 10.

Referring now to FIGS. 2 and 3, each of the first valve passages 220 may have a valve seating surface 224 adjacent the first connective passage 240. Each of the valve seating surfaces 224 may be configured to receive a front element portion 261 of the inlet valve element 260. Likewise, a rear seating surface 225 may exist at the bottom of the valve element port 244 configured to receive a rear element portion 263 of the inlet valve element 260.

The plurality of second valve passages 230 may extend between the second end 214 of the cylindrical valve body 210 and the first connective passage 240. The plurality of second valve passages 230 may extend in a vertical direction parallel with the central axis 12 of the inlet valve system 10. The second connective passage 242 may extend in a horizontal direction perpendicular to the central axis 12 of the inlet valve system 10. The second connective passage 242 may extend between the plurality of valve element ports 244 and the control valve passage 320 of the control valve body 310. Although the first valve passages 220 and the second valve passages 230 may extend in the vertical direction parallel with the central axis 12, the plurality of first valve passages 220 may also extend in a staggered or off-set configuration relative to the plurality of second valve passages 230 at the first connective passage 240.

Each valve element port 244 may include a respective inlet valve element 260, such that the inlet valve element 260 may be at least partially contained in the valve element port 244 and may be moved back and forth within the valve element port 244 to engage or disengage the respective valve seating surface 224 or respective rear seating surface 225. Each first valve passage 220 has a respective valve seating surface 224 that may be axially aligned with the respective inlet valve element 260 and the respective valve element port 244 relative to a respective axis 256 of the respective first valve passage 220. Each inlet valve element 260 may be moved between a closed position and an opened position by applying differential gas pressures to a front element surface 262 and a pin element surface 265 of the inlet valve element 260.

In an embodiment, as seen in FIGS. 2-6, the inlet valve element 260 may be a piston element. The piston element 260 may include the front element portion 261 having a front element surface 262 and the rear element portion 263 having a rear element surface 264. The front element surface 262 and the rear element surface 264 function to engage and disengage the piston element 260 from the valve seating surface 224 and the rear seating surface 225, respectively. The piston element 260 may include a pin 270 connecting the rear element portion 263 to the front element portion 261, and a spring 271 attached to the front element portion 261. The spring 271 enables relative motion between the front element portion 261 and the rear element portion 263. Additionally, the piston element 260 includes a seal/guided bushing combination 272. The seal combination 272 may include a radiused center to allow for tight sealing as well as an angular movement of the pin 270.

Figure 4:
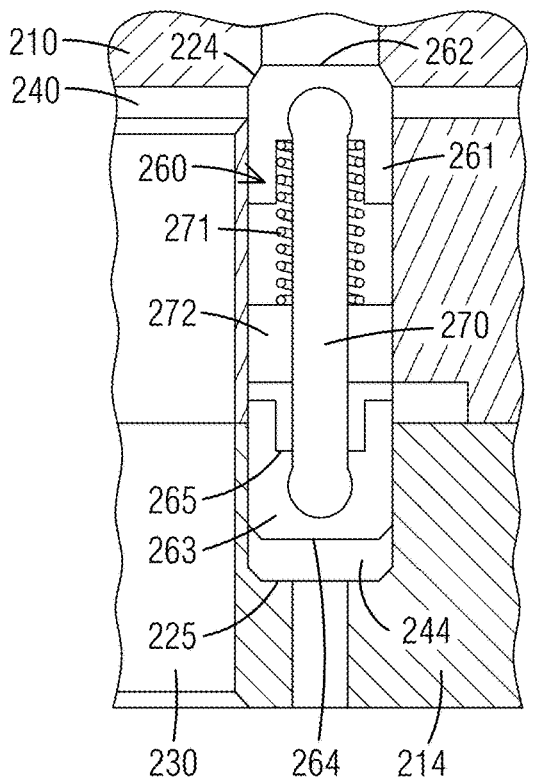
FIG. 4 depicts an enlarged view of an embodiment of an inlet valve element.
Figure 5:
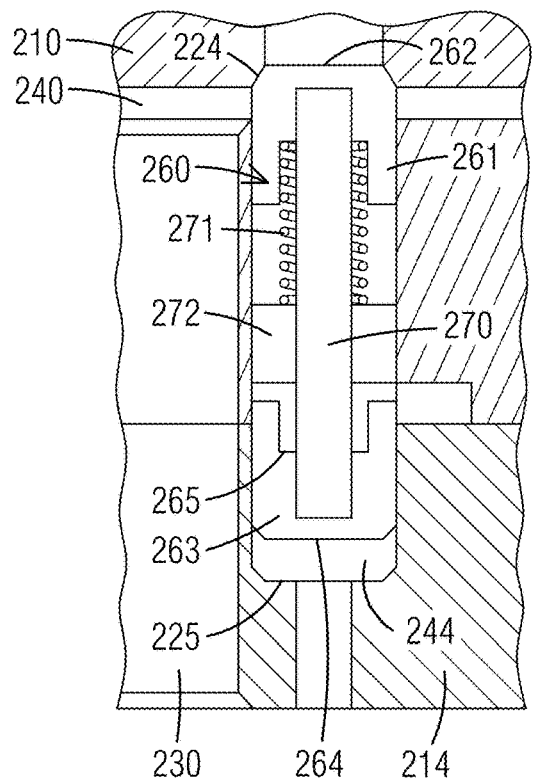
FIG. 5 depicts a further embodiment of an inlet valve element.
Figure 6:
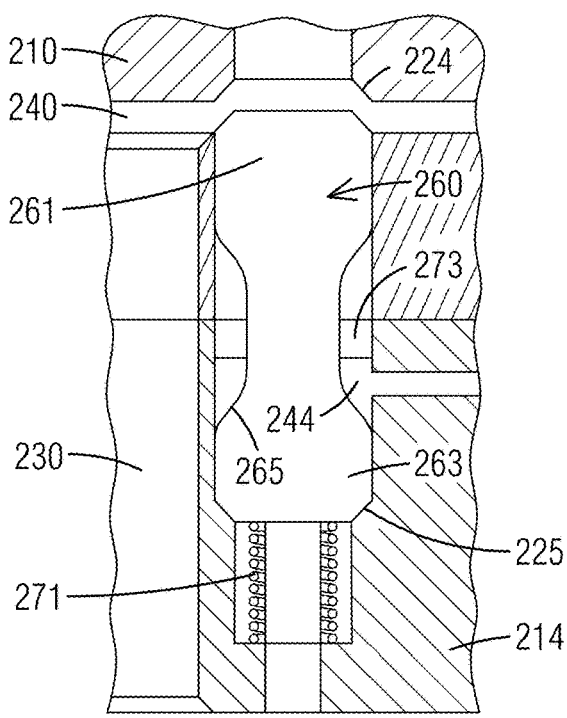
FIG. 6 depicts another embodiment of an inlet valve element.

The heads of the pin 270 may be rounded, as seen in FIG. 4, so that a ball and socket joint exist at the interface between the pin heads and the front and rear portions 261, 263 respectively. The ball and socket design allows the inlet valve element 260 to seal while being misaligned. In a further embodiment, the design of the inlet valve element 260 may include a press fit joint, as seen in FIG. 5. The press fit joint of the pin element along with the front element surface 262 including a spherical surface enables the piston element 260 to easily center itself in the valve seating surface 224 to create a seal. In another embodiment, shown in FIG. 6, the inlet valve element 260 includes a single piece centered within the port 244 by a split seal 273 and having a spring 271 extending in the port 244 attaching the rear element portion 263 to the rear seating surface 225.

Referring now to FIG. 2, the inlet valve element 260 may be moved to disengage the valve seating surface 224 of the first valve passage 220 adjacent the first connective passage 240 in the opened position when applying a higher pressure gas to a pin element surface 265 than to the front element surface 262. Additionally, the rear element portion 263 of inlet valve element 260 will engage with a rear seating surface 225 when the higher pressure gas is applied to the pin element surface 265. The inlet valve element 260 disengages from the valve seating surface 224 because a differential area is created between the rear pin head and the rear element portion 263 which allows the higher pressure gas to create a downward force.

Referring now to FIG. 3, the inlet valve element 260 may be moved to engage the valve seating surface 224 of the first valve passage 220 adjacent the first connective passage 240 in the closed position when discontinuing the flow of the higher pressure gas to the pin element surface 265. The pin element surface 265 is exposed to lower pressure gas from the compressor cylinder 20. An equalized pressure will then exist across rear element 263. Additionally, the rear element portion 263 of the inlet valve element 260 will disengage with the rear seating surface 225 in the closed position. When the valve element 260 is in the closed position, the pressure in the cylinder chamber 20 increases.

Figure 7:
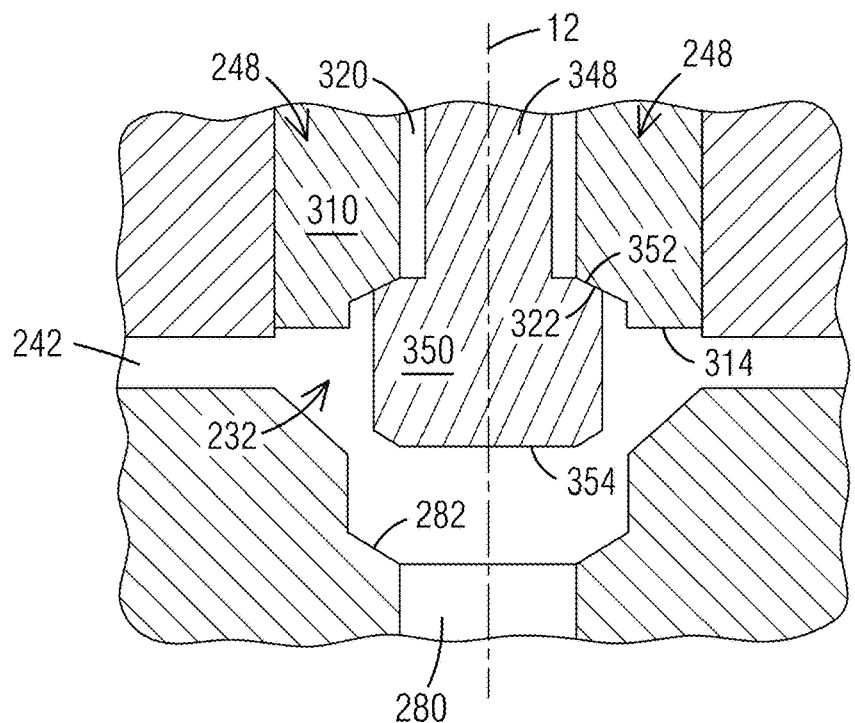
FIG. 7 depicts an enlarged view of the control valve actuator in an inlet valve closed position.
Figure 8:
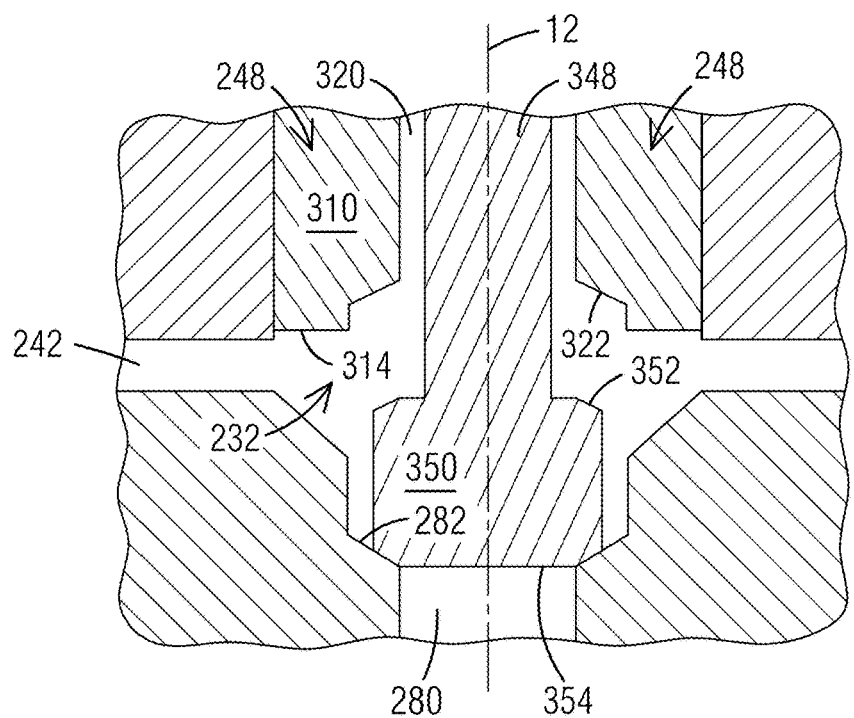
FIG. 8 depicts an enlarged view of the control valve actuator in an inlet valve open position.

The central bore 248 of the cylindrical valve body 210 may extend between the first end 212 and the second end 214 and along the central axis 12 of the inlet valve system 10. The central bore 248 may include at least a portion of the control valve actuator 300 disposed therein. For example, as depicted in FIGS. 2 and 3, the portion of the control valve actuator 300 can extend from the first end 212 of the cylindrical valve body 210 to or adjacent the second connective passage 242. The central bore 248 may also include one or more ports 280 extending between and in fluid communication with the second connective passage 242 and the inlet valve system 10, as depicted in FIGS. 7-8.

The control valve actuator 300 may include a control valve body 310 circumferentially disposed about the central axis 12 of the inlet valve system 10 and may have a first end 312 opposite a second end 314. The control valve body 310 may include a control valve passage 320 extending through at least a portion of the control valve body 310. The control valve body 310 and the control valve passage 320 may extend along the central axis 12 of the inlet valve system 10.

The control valve actuator 300 may also include valve element 350 disposed in the control valve passage 320. The control valve element 350 may include one or more stems 348 coupled thereto. The control valve element 350 may be controlled to laterally move along the central axis 12 of the inlet valve system 10 via one or more controllers 302. The control valve actuator 300 may be or include a direct solenoid, a pneumatic solenoid, a hydraulic solenoid, or any combination thereof.

One or more control pressure sources 360 may be coupled to and in fluid communication with the control valve actuator 300 via the control valve passage 320 at point 332, as depicted in FIG. 1. The control pressure source 360 may contain one or more control gases or fluid that may be used to apply a pressurized gas to each pin element surface 265 for maintaining each of the inlet valve elements 260 disengaged with the valve seating surface 224 in the opened position. The control pressure source 360 may be fluidly coupled to the control valve passage 320 so that the pressure of the control gas at point 332 may be regularly controlled to minimize any leakage or may allow the control pressure to be kept internal to the control valve passage 320. In an embodiment, the control gas used may be gas from the cylinder chamber 20 which is at a discharge pressure that is higher than the inlet gas pressure. A line may fluidly connect the cylinder chamber 20 with the control pressure source 360 so that the gas from the cylinder chamber 20 may be used to apply the higher pressure gas to the pin element surfaces 265.

Referring now to FIGS. 7 and 8 which depict enlarged views of the control valve element 350 of the control valve actuator 300, the inlet valve system 10 may also include a first valve seating surface 322 disposed on the control valve body 310, axially aligned with the control valve element 350 and the control valve passage 320 of the control valve body 310, and adjacent the second connective passage 242, and a second valve seating surface 282 disposed on the cylindrical valve body 210, axially aligned with the control valve element 350 and the central bore 248 of the cylindrical valve body 210, and adjacent the second connective passage 242. The control valve element 350 may be a reciprocating poppet valve element, a rotary valve element, or one or more other types of valve elements.

The control valve element 350 may have a first surface 352 opposite a second surface 354. The lower or second surface 354 on the control valve element may be configured to engage the second valve seating surface 282 disposed on the cylindrical valve body 210, close, prohibit, or otherwise cease fluid communication between the second connective passage 242 and the cylinder chamber 20 of the cylinder 18 at the port 280, and open, allow or otherwise enable fluid communication between the second connective passage 242 and the control pressure source 360, as depicted in FIG. 8. The upper or first surface 352 of the control valve element 350 may be configured to engage the first valve seating surface 322 disposed on the control valve body 310, close, prohibit, or otherwise cease fluid communication between the second connective passage 242 and the control pressure source 360, and open, allow, or otherwise enable fluid communication between the second connective passage 242 and the cylinder chamber 20 of the cylinder, as depicted in FIG. 7.

Figure 9:
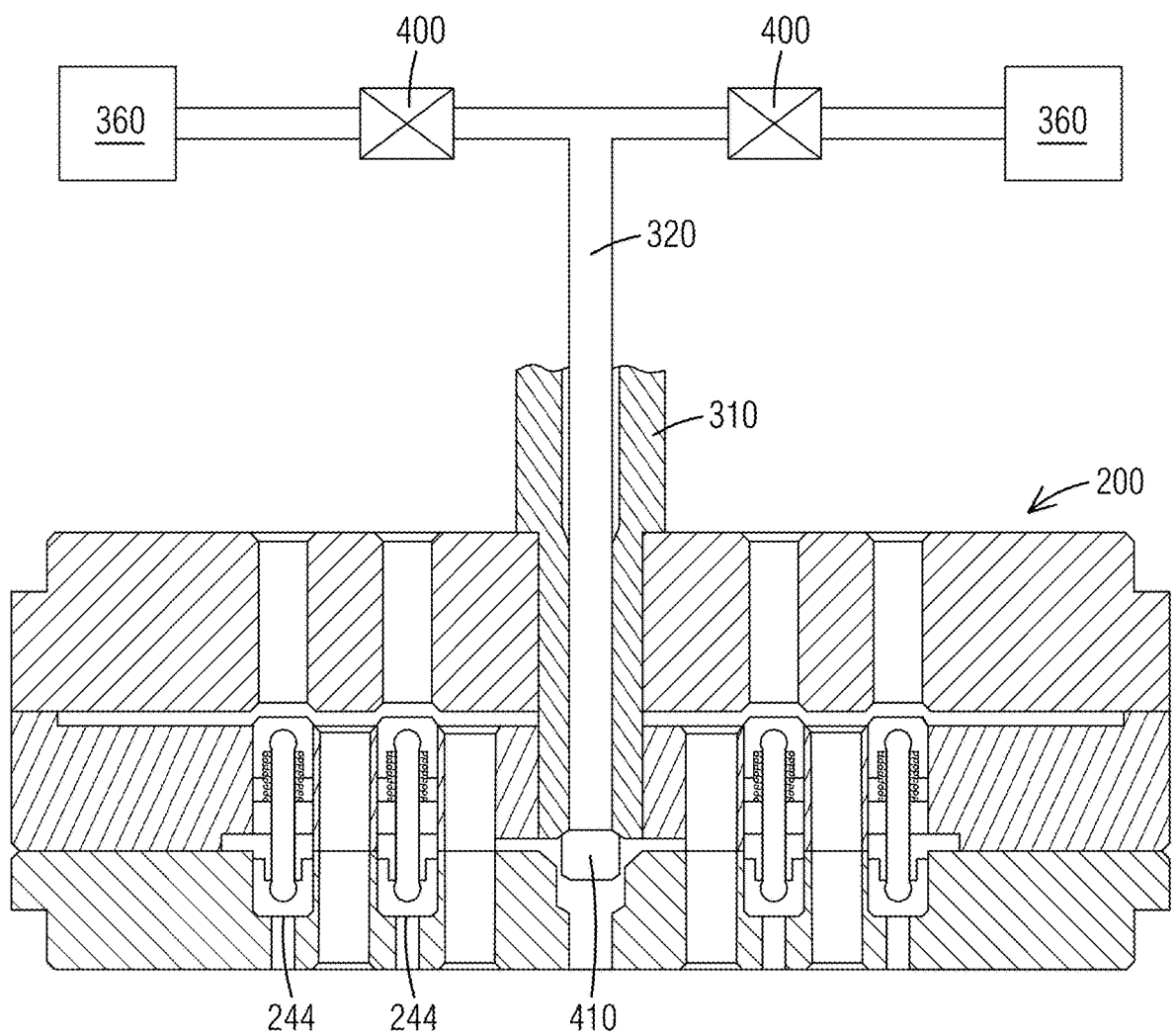
FIG. 9 depicts an alternate embodiment of a control valve actuator.

In an alternate embodiment shown in FIG. 9, instead of utilizing a control valve element 350 disposed within the valve assembly 200, a valve element 400 external to the inlet valve system 10 may be utilized to control the flow of higher pressure gas to the valve ports 244. In this embodiment, a pneumatic relay 410 may be disposed within the control valve passage 320 to control the flow of the higher pressure gas to the valve ports 244. Utilizing external valve elements 400 eliminates a more complex control valve 350 element within the valve body 210.

In view of FIG. 1, one or more process fluids or gases may be transferred from the location external or outside of the cylindrical unloader body 110, through the inlet passage 116, and into the unloader chamber 120 and the plurality of first valve passages 220. The flow path of the process fluid passing from the unloader chamber 120 and the plurality of first valve passages 220 and into the cylinder chamber 20 will be further discussed and described below in view of FIGS. 2 and 3.

FIG. 2 depicts an enlarged view of the valve assembly 200 and the control valve actuator 300 in an inlet valve opened position, such as for transferring a process fluid or gas from the unloader chamber 120 to the cylinder chamber 20, according to one or more embodiments. The process fluid may flow or otherwise pass from the unloader chamber 120 and the plurality of first valve passages 220, through the valve seating surfaces 224, into the first connective passage 240 and across the front element surfaces 262 of the inlet valve element 260, through the plurality of second valve passages 230, and into the cylinder chamber 20. The process fluid may be at a first pressure that may be applied to the front element surfaces 262 of the inlet valve element 260. The first pressure of the process fluid applied at the front element surfaces 262 of the inlet valve element 260 is less than the a second pressure of the control gas applied to the pin element surfaces 365 so that the front element surface 262 of the front element portion 261 remains disengaged with the respective valve seating surface 224.

The second pressure of the control gas may be regulated by maintaining the control valve element 350 disengaged from the first valve seating surface 322 and engaged with the second valve seating surface 282 as depicted in FIG. 8. More specifically, the second pressure of the control gas may be regulated by maintaining the first surface 352 of the control valve element 350 disengaged from the first valve seating surface 322 disposed on the control valve body 310 to provide fluid communication between the second connective passage 242 and the control pressure source 360, and also maintain the second surface 354 of the control valve element engaged to the second valve seating surface 282 disposed on the cylindrical valve body 210. The second pressure at point 232 in FIG. 8 is the same pressure applied from the control pressure source 360 (FIG. 1) and to the pin element surfaces 265, FIG. 2.

Simply put, FIG. 2 illustrates the inlet valve element 260 in the opened position. The control valve element 350 is opened allowing the pin element surface 265 to be exposed to the higher pressure gas. When the inlet valve element 260 is embodied as a piston element, the higher pressure gas creates a downward force on the rear portion of the pin disengaging the inlet valve element 260 from the valve seating surface 224 so that the inlet valve 200 is in the opened position.

FIG. 3 depicts enlarged view of the valve assembly 200 and the control valve actuator 300 in an inlet valve closed position, such as for ceasing the transfer of the process fluid or gas between the unloader chamber 120 and the cylinder chamber 20, according to one or more embodiments. The flow of the control gas may be ceased and a flow of the cylinder gas may be allowed to reach the rear element surface 264. An equalized pressure will then exist at the rear element surface 264 as at the front element surface 262 causing the front element surface 262 to engage with the valve sealing surface 224.

Figure 10:
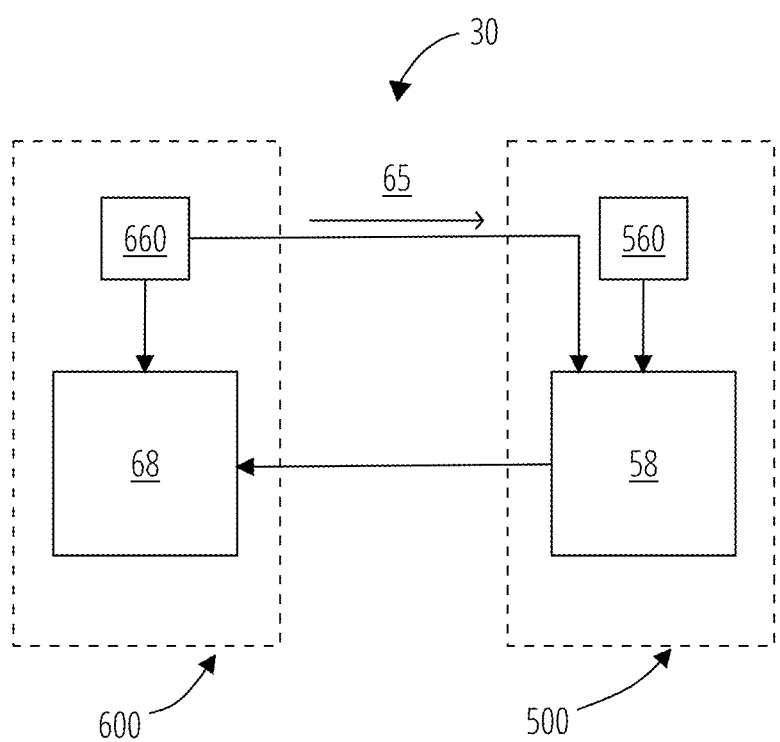
FIG. 10 depicts a multi-stage compressor in accordance with an embodiment.

In an embodiment, a compressor having multiple stages of compression may utilize an inlet valve system 10 described herein that utilizes higher pressure control to hold open the inlet valve elements on a first stage of compression while an inlet valve system utilizing lower pressure control as described in U.S. patent application No. 16/301,197 hold open the inlet valve elements on a higher stage of compression such as the second stage or higher. As mentioned previously, a disadvantage of the inlet valve system utilizing lower pressure control is the venting of lower pressure gas to the atmosphere where it is lost and not utilized further. However, in a multi-stage compressor 30 wherein the inlet valve system utilizing lower pressure control on a second stage or higher, the control gas may be vented back to an inlet of the first stage reciprocating compressor. the inlet valve system utilizing lower pressure control on a second stage or higher, the control gas may be vented back to an inlet of the first stage reciprocating. This arrangement is depicted schematically in FIG. 10, with a second stage cylinder 68 and a first stage cylinder 58. The second stage 600 is controlled utilized using low pressure control 660 while the first stage 500 utilizes high pressure control 560 and the control gas 65 from the low pressure control 660 maybe vented to an inlet of the first stage 500.

A method for utilizing a high pressure gas source to control an inlet valve system 10 of a reciprocating compressor is also provided. The method may include flowing a process fluid from an unloader 100, through a valve assembly 200, and into the cylinder chamber 20. The valve assembly 200 may include a plurality of inlet valve elements 260, and each inlet valve element 260 may be disengaged with a valve seating surface 224 in an opened position for providing a process fluid to flow through the valve assembly 200. Each valve element 260 may have a front element surface 262 and a pin element surface 265, and the process fluid may apply a first pressure to each of the front element surfaces 262.

The method may also include flowing a control gas to the pin element surfaces 265. The control gas may apply a second pressure, which may be greater than the first pressure, to each of the pin element surfaces 265 to maintain each of the inlet valve elements 260 disengaged with the valve seating surface 225 and in the opened position.

The method may also include adjusting the control valve actuator to cease the control gas flowing to the rear element surface and flow the cylinder gas to the pin element surfaces 265, wherein the pin element surfaces are exposed to a cylinder gas with a pressure equal to the first pressure, so that each of the front element surfaces 262 engage each of the valve seating surfaces 224 in the closed position.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. An inlet valve system for a cylinder chamber of a reciprocating compressor, comprising:

an unloader comprising a cylindrical unloader body circumferentially disposed about a central axis of the inlet valve system and having an enclosed end opposite an open end, a central bore extending between the enclosed end and the open end within the cylindrical unloader body and defining an unloader chamber, and an inlet passage defined by the cylindrical unloader body and configured to provide fluid communication between the central bore and a location external of the cylindrical unloader body;

a valve assembly comprising a cylindrical valve body circumferentially disposed about the central axis of the inlet valve system, and having a first end opposite a second end, a plurality of first valve passages, a plurality of second valve passages, a first connective passage, a second connective passage, a plurality of inlet valve elements disposed in a plurality of valve element ports, and a central bore ending between the first end and the second end of the cylindrical valve body and along the central axis of the inlet valve system, wherein:

the valve assembly is disposed at the open end of the cylindrical unloader body, the plurality of first valve passages extend between the first end of the cylindrical valve body and the first connective passage, and each of the first valve passages has a valve seating surface adjacent the first connective passage, the plurality of second valve passages extend between the second end of the cylindrical valve body and the first connective passage, the second connective passage extends between the plurality of valve element ports and the central bore of the cylindrical valve body, each valve element port at least partially contains a respective inlet valve element of the plurality of inlet valve elements, each inlet valve element is configured to move between a closed position to an opened position by applying differential gas pressures to a front element surface of a front element portion of the inlet valve element and to a pin element surface of the inlet valve element, disengage the valve seating surface of the first valve passage adjacent the first connective passage in the opened position when applying a higher second pressure to the pin element surface than a first pressure at the front element surface and engage the valve seating surface of the first valve passage adjacent the first connective passage in the closed position by discontinuing the application of the higher pressure to the pin element surface so that the second pressure is the same as that of the cylinder chamber; and a control valve actuator comprising a control valve body circumferentially disposed about the central axis of the inlet valve system and having a first end opposite a second end, a control valve passage of the control valve body extending along the central axis of the inlet valve system, a control valve element disposed in the control valve passage, and a control pressure source fluidly coupled to the control valve passage, wherein the pin element surface of the inlet valve element is located between the front element surface and a rear element surface.

2. The inlet valve system of claim 1, wherein the inlet valve element is a piston element including the front element portion having the front element surface, the rear element portion having the rear element surface, a pin element connecting the front element portion to the rear element portion, the pin element attached to the front element portion by a spring, and wherein when the higher pressure is applied to the pin element surface, the pin element forces the rear element portion downwards within the valve element port placing the inlet valve element in the opened position.

3. The inlet valve system of claim 2, wherein the attachment of the pin element to the front element portion and the attachment of the pin element to the rear element portion is a ball and socket attachment.

4. The inlet valve system of claim 2, wherein the attachment of the pin element to the front element portion and the attachment of the pin element to rear element portion is a press fit attachment.

5. The inlet valve system of claim 1, wherein the inlet valve element is a single piece having a spring which extends within the valve element port and attaches the rear element portion to the rear seating surface.

6. The inlet valve system of claim 1, wherein the valve body comprises a single piece.

7. The inlet valve system of claim 6, wherein the valve body is manufactured by additive manufacturing.

8. The inlet valve system of claim 1, further comprising:
a first valve seating surface disposed on the control valve body, axially aligned with the control valve element and the control valve passage of the control valve body, and adjacent the second connective passage;
a second valve seating surface disposed on the cylindrical valve body, axially aligned with the control valve element and the central bore of the cylindrical valve body, and adjacent the second connective passage.

9. The inlet valve system of claim 8, wherein a first surface of the control valve element is configured to engage the first valve seating surface disposed on the control valve body, cease fluid communication between the second connective passage and the control pressure source, and enable fluid communication between the second connective passage and the cylinder chamber.

10. The inlet valve system of claim 8, wherein a second surface of the control valve element is configured to engage the second valve seating surface disposed on the cylindrical valve body, cease fluid communication between the second connective passage and the cylinder chamber, and enable fluid communication between the second connective passage and the control pressure source.

11. The inlet valve system of claim 1, wherein the control pressure source is fluidly coupled to the cylinder chamber in order to carry a discharge gas from a discharge chamber of the compressor to the pin element surface at a higher pressure than the first pressure.

12. A compressor having multiple stages of compression, comprising:
a plurality of reciprocating compressors, each compressor corresponding to a compression stage of the compressor, the plurality of reciprocating compressors comprising,
at least one high pressure inlet valve system as claimed in claim 1 disposed in a cylinder chamber of a first reciprocating compressor corresponding to a first stage of the compressor, and
at least one low pressure inlet valve system disposed in a cylinder chamber of a second reciprocating compressor corresponding to a second stage of the compressor, the low pressure inlet valve system operating such that when applying a control gas having a lower pressure to a rear element surface than a pressure at a front element surface of an inlet valve element of the low pressure inlet valve system, the inlet valve element is disengaged from a valve seating surface,
wherein the control gas is vented to an inlet of the first reciprocating compressor.

13. A method for utilizing a high pressure gas source to control an inlet valve system of a reciprocating compressor, comprising:
flowing a process fluid from an unloader, through a valve assembly, and into the cylinder chamber, wherein the valve assembly comprises a plurality of inlet valve elements, wherein each inlet valve element is disengaged with a valve seating surface in an opened position for providing the process fluid to flow through the valve assembly, wherein each inlet valve element has a front element surface and a pin element surface and wherein the process fluid applies a first pressure to each of the front element surfaces;
flowing a control gas from the high pressure gas source to the pin element surfaces, by adjusting a control valve actuator to an open position, wherein the control gas applies a second pressure to each of the pin element surfaces to maintain each of the inlet valve elements disengaged with the valve seating surface in the opened position, wherein the second pressure is higher than the first pressure; and
adjusting the control valve actuator to a closed position to cease the control gas flowing to the pin element surfaces, wherein an equalized pressure exists at each of the pin element surfaces as that at the front element surfaces and moves each of the inlet valve elements to engage the valve seating surfaces in a closed position, wherein the pin element surface of each inlet valve element is located between the front element surface and a rear element surface of each inlet valve element.

14. The method as claimed in claim 13, wherein the high pressure source is fluidly coupled to the cylinder chamber to carry a discharge gas to the pin element surface at a higher pressure than the first pressure.

15. The method as claimed in claim 13, wherein the inlet valve element is a piston element including a front element portion having the front surface, a rear element portion having the rear element surface, a pin element connecting the front element portion to the rear element portion, the pin element attached to the front element portion by a spring, and wherein when the higher pressure is applied to the pin element surface, the pin element forces the rear element portion downwards within the valve element port placing the inlet valve element in the opened position.

16. The method as claimed in claim 15, wherein the attachment of the pin element to the front element portion and the attachment of the pin element to the rear element portion is a ball and socket attachment.

17. The method as claimed in claim 15, wherein the attachment of the pin element to the front element portion and the attachment of the pin element to rear element portion is a press fit attachment.

18. The method as claimed in claim 13, wherein the inlet valve element is a single piece having a spring which extends within the valve element port and attaches the rear element portion to the rear seating surface, and wherein when the higher pressure is applied to the pin element surface, the pin element forces the rear element portion downwards within the valve element port placing the inlet valve element in the opened position.

* * * * *